US 6,591,694 B2

(12) United States Patent
Tsai et al.

(10) Patent No.: US 6,591,694 B2
(45) Date of Patent: Jul. 15, 2003

(54) FLOW METER WITH A SELF-ILLUMINATING FLOATER

(75) Inventors: Yang-Jinn Tsai, Hsin-Chu (TW); Chang-Hsin Lin, Tou-Fen (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 69 days.

(21) Appl. No.: 09/881,543

(22) Filed: Jun. 14, 2001

(65) Prior Publication Data

US 2002/0189368 A1 Dec. 19, 2002

(51) Int. Cl.⁷ ............................................... G01F 1/22
(52) U.S. Cl. .................................................. 73/861.57
(58) Field of Search ........................ 73/861.55, 861.56, 73/861.57, 293, 322.5, 305; 43/17, 17.5, 17.6; 340/691.5, 573, 555, 573.1, 573.2, 815.73, 815.74

(56) References Cited

U.S. PATENT DOCUMENTS

| | | | | |
|---|---|---|---|---|
| 3,982,087 A | * | 9/1976 | Bachman | 200/84 |
| 4,335,618 A | * | 6/1982 | Bucsky et al. | 73/861.56 |
| 5,231,781 A | * | 8/1993 | Dunbar | 43/17.5 |
| 5,645,336 A | * | 7/1997 | Brown et al. | 73/293 X |
| 5,898,372 A | * | 4/1999 | Johnson et al. | 340/573.2 |
| 5,974,721 A | * | 11/1999 | Johnson et al. | 43/17.6 |
| 6,293,143 B1 | * | 9/2001 | Denton et al. | 73/293 |

* cited by examiner

Primary Examiner—Hezron Williams
Assistant Examiner—Charlene Dickens
(74) Attorney, Agent, or Firm—Tung & Associates

(57) ABSTRACT

A flow meter comprises a housing with a tube, a floater inside the tube, and a permanent magnet embracing the housing. The volume of a fluid being passed through the tube defines the height of the floater position in the tube. The floater is equipped with a rotation coil and bulb connected thereto. Rotating the floater in the magnetic field of the permanent magnet under the influence of a fluid induces a voltage in the coil, and the bulb is turned on making reading volume values easier and more convenient.

15 Claims, 1 Drawing Sheet

FLOW METER WITH A SELF-ILLUMINATING FLOATER

BACKGROUND OF THE INVENTION

1. Field of the Invention

The present invention relates to flow meters, and more specifically to flow meters with self-illuminating floaters.

2. Description of the Related Art

It is frequently necessary in an industrial setting to measure the flow of fluids through pipes. For example, in bulk processing of compounds in chemical plants the amount of various fluids being introduced into a reaction vessel must be determined and controlled. In plant operations requiring pressurized air or steam it is often desirable or necessary to monitor consumption of these fluids. In other instances, the supplier of a working fluid or fuel desires to know the quantity of fluid delivered in order that an appropriate fee may be charged. A number of fluid flow measuring devices are currently known.

The most commonly used fluid flow metering devices can be generally categorized as belonging to one of the following groups.

Positive displacement meters function by receiving and discharging discrete volumes of fluid through, for example, a reciprocating piston in a cylinder. The number of cycles of such a device occurring in a unit period of time is proportional to the flow rate of fluid passing through the meter. Although accurate, positive displacement meters are mechanically complex and are highly sensitive to foreign matter contamination.

Obstruction type meters employ an orifice or other restriction in the fluid path and the flow rate is calculated from the measured pressure drop across the restriction. Those meters generally have limited measurement ranges and are highly sensitive to the flow patterns of the fluid passing therethrough. Moreover, obstruction meters provide instantaneous flow measurement, which must be integrated to evaluate total flow.

Rotating vane type meters are frequently used in measuring fluid flow. These meters function by causing the flowing fluid to impart a tangential force on an impeller causing rotation thereof. The rotational velocity of the impeller is related to volumetric flow rate.

Variable area flow meter provides a weighted member movably disposed across an orifice such that the position of the weighted member determines the orifice area. The weighted member provides an essentially constant fluid head against the fluid entering the system so that the displacement of the weighted member is essentially a linear relation with the rate of volumetric flow of the fluid.

The principal advantage of a variable area flow meter is that, at low cost, it provides a wide range of capacity with low system resistances and is essentially linear. One well-known and popular form of variable area flow meter, often called a rotameter and considered the closest analog to the present invention, is shown in FIG. 1. A flow meter 10 utilizes a floater 12 moving vertically within a tapered tube 14, usually transparent, whose area increases upwardly. A diameter 16 of the metering floater 12 in the rotameter 10 is slightly less than the minimum inside diameter 18 of the tube 14, so when the floater 12 is placed within the tube 14, any clearance between the floater 12 and tube 14 forms an annular orifice 20, a cross sectional area thereof varying in accordance with the position of the floater 12. In this type of rotameter, a weighted floater 12 contained in an upright tapered tube 14 is raised to a position of equilibrium between the downward gravitational force of the floater 12 (symbolically shown by an arrow 22) and the upward force of the fluid flowing past the floater 12 through the annular orifice 20 surrounding the floater 12, which force is symbolically shown by arrows 24. This position of equilibrium is therefore a function of flow rate—the greater the flow rate, the higher the vertical position of the floater.

When the stream of fluid to be measured is made to enter the lower end 26 of the tube 14, it causes the floater 12 to rise to a height where its weight is just balanced by the pressure drop across the orifice 20. At the same time, the floater 12 rotates, and the very term "rotameter" was derived from the fact that floaters have slits (like those with reference numeral 28 in FIG. 1) to impart a rotational force thereto for the purpose of centering and stabilizing the floater. The tube 14 is typically made of glass or other suitable materials imprinted with a graduated scale 30 such that the position of the floater 12 may be correlated with flow rate of the particular fluid under test. High sensor 32 and low sensor 34 may be installed outside the tube to catch the highest and lowest permissible readings, 36 and 38, respectively.

A disadvantage of the rotameter described in the above is that visual reading the results of the tests is infrequently difficult since the graduated scale 30 may not be clearly visible because of absence of outer light—in dark periods of a day or when the flow meter is placed, say, under a machine. Another reason for the visual reading to be impaired is particles in the flow that may cause fouling and/or scaling of the tube 14. These reasons may cause either misreading the results or make reading impossible at all.

SUMMARY OF THE INVENTION

Therefore, the object of the present invention is to provide a flow meter that, while possessing the advantages of the flow meters known in the art, would be free of their disadvantages.

One more object of the invention is to provide a flow meter with easily readable metering results.

Still one more object of the present invention is to provide a flow meter with a self-illuminating floater.

According to the present invention, providing a variable area flow meter that comprises a housing and a floater therein attains the above objects. The housing is placed inside a U-shaped permanent magnet, and the floater includes a rotor coil. Connected to the rotor coil is a DC bulb. An ascending fluid flow rotates the floater. The rotation of the floater with the rotor coil in the magnetic field of the permanent magnet causes a direct current to flow through the bulb. Light from the bulb makes it easier to read the results of metering.

BRIEF DESCRIPTION OF THE DRAWINGS

The above objects, as well as advantages and features of the present invention will be better understood from an ensuing detailed description of the preferred embodiment thereof when considered in conjunction with the accompanying drawing where.

DESCRIPTION OF THE PREFERRED EMBODIMENT

Figure 1:
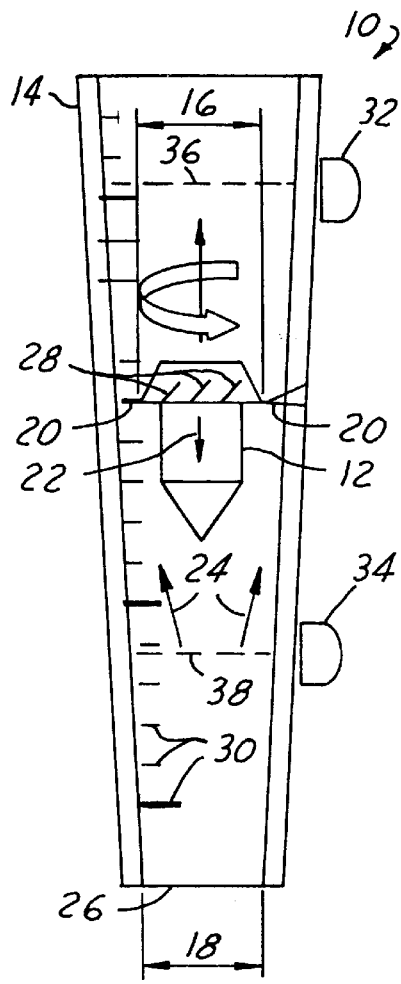
FIG. 1 is a sketch illustrating a prior art design of the flow meter improved by the present invention.
Figure 2A:
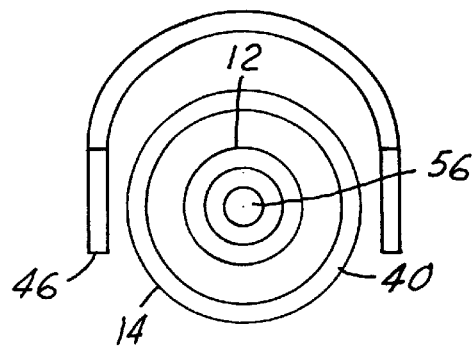
FIG. 2 shows a view of the flow meter with a self-illuminating floater according to principles of the present invention.
Figure 2B:
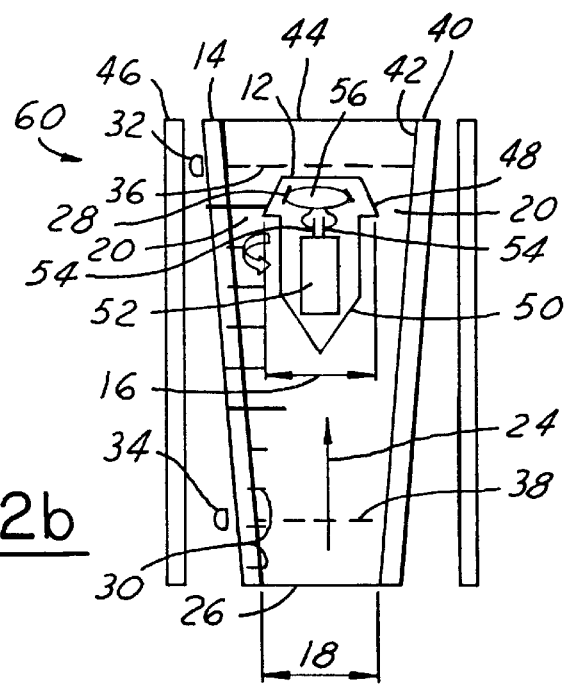

Referring now to FIG. 2, where elements similar to those depicted in FIG. 1 are assigned same reference numerals, a flow meter 10 constituting an object of the present invention comprises a housing 40, including a tube 14, and a floater 12. In general, the tube 14 may have a cylindrical shape and a uniform diameter of its inner hollow 42 along its entire length. It is preferable, however, that the inner hollow have a profile of a truncated cone, whose cross-section area increases from its minimal value at a lower end 26 to its maximum value at its upper end 44.

The housing 40 of the flow meter 10 is placed inside a permanent magnet 46 expanding along the tube 14 and having a U-shape cross-section, a vertical axis (not shown) of the housing preferably coinciding with a vertical axis of symmetry (not shown) of the U-shape permanent magnet 46. Located inside the tube 14 is a metering floater 12 comprising a head 48 of a larger diameter and a body 50 of a smaller diameter, the head diameter 16 being slightly less than the minimal diameter 18 of the tube 14 at its lower end 26. The head 48 is provided with slits 28 on its surface, which contribute in operation to imparting a rotational force to the floater 12 for the purpose of centering and stabilizing the floater.

The floater 12 is provided with an electromagnetically operated source of light. Specifically, the floater comprises a rotor coil 52 therein that has its ends 54 connected to a DC bulb 56. The coil 52 and the bulb 56 in their combination constitute the source of light.

In operation, when a fluid, which, as the case may be, is a gas or liquid flow, goes up through the tube 12, it engages slits 28 on the head 48 of the floater 12, and the floater starts rotating. A position of the floater heightwise inside the tube 14 is defined by the relation between the rate, at which the fluid is received in the tube 14, and the weight of the floater 12. In general, the volume Q of the fluid flowing through the flow meter for a time unit is defined as a product of the area A, through which the fluid flows, and the velocity V, at which the fluid flows through the area A:

$$Q(cm^3/s) = A(cm^2) \cdot V(cm/s)$$

The tube 14 can be made of glass or other convenient translucent or transparent material, such that the light of the bulb 56 can be viewed. A graduated scale 30 is applied to (for example, imprinted on) the tube 14 such that the exact position of the floater 12 may be correlated with flow rate of the particular fluid under test. High sensor 32 and low sensor 34 may be installed outside the tube to catch the highest and lowest permissible readings, 36 and 38, respectively. In this way, flow high/low alarm can be realized, as well as related PID (standing for Proportional, Integral, Derivative) control or monitoring function.

The rotation of the floater 12 takes place in the magnetic field created by the permanent magnet 46, which field permeates the tube 14. Crossing field lines induces a voltage in the rotor coil 52 of the floater 12, and an electric current starts flowing through the bulb 56 turning it on.

Providing a flow meter with a source of light brings a number of advantages. With such a device, it is now easy to find out the exact flow status. While the floater is rotating and shining, the actual flow rate can be determined. If there is no rotation and the light is therefore off, it is a symptom that some error occurred such as clogging the fluid. Additionally, the light does not need an extraneous source of power, except for the permanent magnet 46, and thus is an energy-saver.

While the preferred embodiment of the present invention has been disclosed hereinabove, it is to be understood that this embodiment is given by example only and not in a limiting sense. Those skilled in the art may make various modifications and additions to the preferred embodiment chosen to illustrate the invention without departing from the spirit and scope of the present contribution to the art. Accordingly, it is to be realized that the patent protection sought and to be afforded hereby shall be deemed to extend to the subject matter claimed and all equivalence thereof fairly within the scope of the invention.

What is claimed is:

1. A self-illuminating floater for a flow meter of the type comprising a housing including a tube, a hollow of said tube having a cross-section area increasing from minimal at a lower end of said tube to a maximal at an upper end of said tube, and a permanent magnet extending along said housing and having a U-shape profile, said housing being placed into said U-shape profile of said permanent magnet, said floater comprising an electromagnetically operated source of light, whereby said source of light is on upon rotating said floater in a magnetic field of said permanent magnet under an influence of a fluid being passed through said tube.

2. The self-illuminating floater as claimed in claim 1, wherein said source of light comprises a rotation coil and bulb, ends of said rotation coil being connected to said bulb.

3. The self-illuminating floater as claimed in claim 2, further comprising a head and a body, said body including said rotation coil, said head comprising said bulb.

4. The self-illuminating floater as claimed in claim 3, wherein said head is made with slits on its surface, to thereby impart a rotational force to said floater under the influence of said fluid being passed through said tube for the purpose of centering and stabilizing said floater.

5. The self-illuminating floater as claimed in claim 1, wherein said tube is made translucent and marked with a graduated scale such that the exact position of said floater heightwise within said tube correlated with flow rate of said fluid is visibly attributed to a respective reading in accordance with formula $$Q = A \cdot V,$$

where Q is the volume of said fluid flowing through the flow meter per a time unit, A is the area, through which said fluid flows, and V is the velocity, at which said fluid flows through said area A.

6. A self-illuminating floater for a flow meter of the type comprising a housing including a tube and a permanent magnet extending along said housing and having a U-shape profile, said housing being placed into said U-shape profile of said permanent magnet, said floater comprising a body and a head, said body comprising a rotation coil, said head comprising a bulb, ends of said rotation coil being connected to said bulb, said head being made with slits on its surface, to thereby impart a rotational force to said floater for the purpose of centering and stabilizing said floater under the influence of said fluid being passed through said tube, whereby said bulb is on upon rotating said floater in a magnetic field of said permanent magnet under an influence of a fluid being passed through said tube.

7. The self-illuminating floater as claimed in claim 6, wherein a hollow of said tube has a cross-section area increasing from minimal at a lower end of said tube to a maximal at a upper end of said tube.

8. The self-illuminating floater as claimed in claim 6, wherein said tube is made translucent and marked with a graduated scale such that the exact position of said floater heightwise within said tube correlated with flow rate of said fluid is visibly attributed to a respective reading in accordance with formula $$Q = A \cdot V,$$

where Q is the volume of said fluid flowing through the flow meter per a time unit, A is the area, through which said fluid flows, and V is the velocity, at which said fluid flows through said area A.

9. A flow meter comprising a housing including a tube with a floater located inside the tube and a permanent magnet extending along said housing and having a U-shape profile, said housing being placed into said U-shape profile of said permanent magnet, said floater comprising an electromagnetically operated source of light, whereby said source of light is on upon rotating said floater in a magnetic field of said permanent magnet under an influence of a fluid being passed through said tube.

10. The flow meter as claimed in claim 9, wherein a hollow of said tube has a cross-section area increasing from minimal at a lower end of said tube to a maximal at an upper end of said tube.

11. The flow meter as claimed in claim 9, wherein said tube is made translucent and marked with a graduated scale such that the exact position of said floater heightwise within said tube correlated with flow rate of said fluid is visibly attributed to a respective reading in accordance with formula $$Q = A \cdot V,$$

where Q is the volume of said fluid flowing through the flow meter per a time unit, A is the area, through which said fluid flows, and V is the velocity, at which said fluid flows through said area A.

12. The flow meter as claimed in claim 9, wherein said source of light comprises a rotation coil and bulb, ends of said rotation coil being connected to said bulb.

13. The flow meter as claimed in claim 12, wherein said floater comprises a head and a body, said body including said rotation coil, said head comprising said bulb.

14. The flow meter as claimed in claim 9, wherein said head is made with slits on its surface, to thereby impart a rotational force to said floater under the influence of said fluid being passed through said tube for the purpose of centering and stabilizing said floater.

15. A flow meter comprising a housing including a tube with a floater located inside the tube and a permanent magnet extending along said housing and having a U-shape profile, said housing being placed into said U-shape profile of said permanent magnet, said floater comprising an electromagnetically operated source of light and being made with slits on its surface, to thereby impart a rotational force to said floater, whereby said source of light is on upon rotating said floater in a magnetic field of said permanent magnet under an influence of a fluid being passed through said tube.

* * * * *